United States Patent
Thebud

(10) Patent No.: US 12,006,455 B2
(45) Date of Patent: Jun. 11, 2024

(54) ADHESIVE PRINTING FORM ATTACHMENT LAYER, METHOD FOR ITS MANUFACTURE, AND PRINTING FORM ATTACHMENT CYLINDER COMPRISING THE SAME

(71) Applicant: tesa SE, Norderstedt (DE)

(72) Inventor: Nils Thebud, Lüneburg (DE)

(73) Assignee: tesa SE, Norderstedt (DE)

(*) Notice: Subject to any disclaimer, the term of this patent is extended or adjusted under 35 U.S.C. 154(b) by 305 days.

(21) Appl. No.: 17/144,412

(22) Filed: Jan. 8, 2021

(65) Prior Publication Data

US 2021/0214589 A1    Jul. 15, 2021

(30) Foreign Application Priority Data

Jan. 9, 2020    (EP) .................................... 20150834

(51) Int. Cl.
| | | |
|---|---|---|
| *C09J 7/38* | (2018.01) | |
| *B41F 5/24* | (2006.01) | |
| *B41F 13/08* | (2006.01) | |
| *C09J 5/00* | (2006.01) | |
| *C09J 7/20* | (2018.01) | |
| *C09J 7/24* | (2018.01) | |
| *C09J 7/25* | (2018.01) | |
| *C09J 175/06* | (2006.01) | |
| *C09J 175/08* | (2006.01) | |
| *C09J 175/14* | (2006.01) | |
| *C09J 175/16* | (2006.01) | |

(52) U.S. Cl.
CPC ............... *C09J 7/385* (2018.01); *B41F 5/24* (2013.01); *B41F 13/08* (2013.01); *C09J 5/00* (2013.01); *C09J 7/20* (2018.01); *C09J 7/243* (2018.01); *C09J 7/245* (2018.01); *C09J 7/25* (2018.01); *C09J 7/255* (2018.01); *C09J 7/38* (2018.01); *C09J 175/06* (2013.01); *C09J 175/08* (2013.01); *C09J 175/14* (2013.01); *C09J 175/16* (2013.01); *C09J 2301/122* (2020.08); *C09J 2301/16* (2020.08); *C09J 2301/302* (2020.08); *C09J 2301/416* (2020.08); *C09J 2423/046* (2013.01); *C09J 2423/106* (2013.01); *C09J 2427/006* (2013.01); *C09J 2433/00* (2013.01); *C09J 2467/006* (2013.01); *C09J 2475/00* (2013.01); *C09J 2477/006* (2013.01)

(58) Field of Classification Search
None
See application file for complete search history.

(56) References Cited

U.S. PATENT DOCUMENTS

| | | | |
|---|---|---|---|
| 9,018,319 B2 * | 4/2015 | Kanagawa | C08G 18/44 |
| | | | 525/453 |
| 2002/0174946 A1 * | 11/2002 | Ikeda | C08G 18/4233 |
| | | | 428/354 |
| 2010/0199871 A1 | 8/2010 | Vest et al. | |
| 2015/0361307 A1 | 12/2015 | Van Wert et al. | |
| 2016/0053141 A1 * | 2/2016 | Grun | C09J 197/002 |
| | | | 524/13 |
| 2017/0313915 A1 | 11/2017 | Pütz et al. | |

FOREIGN PATENT DOCUMENTS

| | | |
|---|---|---|
| JP | 2003082059 A | 3/2003 |
| JP | 2006117858 A | 5/2006 |
| KR | 101083922 B1 | 6/2007 |
| WO | 9519267 | 7/1995 |
| WO | 2010090685 A1 | 8/2010 |

OTHER PUBLICATIONS

Nik Salleh, Nik Ghazali, et al., "Development of Scratch- and Abrasion-Resistant Coating Materials Based on Nanoparticles, Cured by Radiation," International Journal of Polymeric Materials, 2009, 422-451, 58:8, Taylor & Francis Group, LLC, DOI: 10.1080/00914030902936501, 32 pages.
European Patent Office, European Search Report and European Search Opinion, European Patent Application No. 20150834.8, dated Jun. 26, 2020, 9 pages.
Action issued in European Patent Application EP 20150834.8 dated Jul. 7, 2023, 3 pages.

* cited by examiner

*Primary Examiner* — Frank D Ducheneaux
(74) *Attorney, Agent, or Firm* — Price Heneveld LLP

(57) ABSTRACT

The present invention relates to an adhesive printing form attachment layer comprising a support, and a permanently sticky layer suitable for receiving a printing form and fixing a printing form during a printing operation provided on the support, wherein the permanently sticky layer comprises a crosslinked structure obtained by crosslinking a crosslinkable composition comprising at least one polyurethane-based polymeric compound that has two or more crosslinkable groups, which are preferably ethylenically unsaturated groups, and two or more —NHC(O)O— linkages. A method of preparing the adhesive printing form attachment layer and of operating a printing machine using the adhesive printing form attachment layer are also disclosed.

19 Claims, No Drawings

ADHESIVE PRINTING FORM ATTACHMENT LAYER, METHOD FOR ITS MANUFACTURE, AND PRINTING FORM ATTACHMENT CYLINDER COMPRISING THE SAME

CROSS-REFERENCE TO RELATED APPLICATION

This application claims the benefit of priority under 35 U.S.C. § 119 of European Patent Application No. 20150834.8, filed 9 Jan. 2020, the contents of which are relied upon and incorporated herein by reference in their entirety.

BACKGROUND

Field of the Disclosure

The present disclosure relates to an adhesive printing form attachment layer that is used on a printing cylinder in a flexographic printing process for adhesively fixing the printing form (i.e., the printing plate) to the cylinder during the printing process, and to a manufacturing process for the adhesive printing form attachment layer. The present invention further relates to a printing cylinder or a set of printing cylinders each being equipped with the adhesive printing form attachment layer, and to the use of the adhesive printing form attachment layer in a flexographic printing process.

Description of Related Art

There are several known methods of attaching a printing plate to a printing cylinder. The most widely used method is the use of a double-sided adhesive tape. A second method involves the use of an adhesive printing form attachment layer that includes an adhesive photopolymer to adhere the printing plate to the printing cylinder. This method is described for instance in WO 95/19267.

The use of a double-sided adhesive tape is problematic in that there may occur difficulties in removing the tape from the printing cylinder and/or from the printing plate. Also, the double-sided adhesive tape frequently leaves residues behind which will later interfere with the reuse of the printing plate or will deteriorate the printing performance in subsequent printing operations. Attaching the double-sided adhesive tape uniformly and without causing surface irregularities that impair the printed image is also a cumbersome manual operation. In addition, the use of multiple pieces of double-sided adhesive tape, as is generally required, makes alignment of the printing plate on the printing cylinder difficult, especially since removal and repositioning is difficult.

WO 95/19267 describes the use of an adhesive printing form attachment layer to replace the double-sided adhesive tapes. The general term "adhesive" is used here in the meaning of "permanent tacky" or "permanent sticky", and the same meaning is encompassed by this term in the present disclosure. There is however no specific teaching on the chemistry and the method for manufacturing the adhesive printing form attachment layer, other than that it is photopolymeric.

WO 2010/090685 A1 describes a means for removably attaching a printing plate to a printing cylinder using an intermediate sheet of photopolymer. The stickiness of the photopolymer is used to attach itself to the printing cylinder and to attach the printing plate to it. Microspheres are incorporated into the photopolymer sheet to provide a cushioning effect when in use on the printing press.

The photopolymer layer referred to in that document is prepared by mixing the components of the photopolymer, i.e., binder, monomer, photoinitiator and microspheres, and curing the composition after it is cast or extruded into a sheet, followed by irradiation with UV. That document states that the amount of radiation necessary varies based upon the composition and thickness of the photopolymer, and that the amount of radiation used, and therefore the extent of curing, can be used to control the stickiness of the photopolymer. However, the curing must be sufficient to achieve sufficient integrity and strength. That is in particular required because the photopolymer layer of that document does not contain a substrate on which the photopolymeric layer is provided; instead the extruded photopolymeric layer is attached directly to the printing cylinder.

With a layer of that kind, due to the adhesive attachment of the photopolymer sheet to both the printing cylinder and the printing form (printing plate) on opposing sides of the photopolymer sheet, the layer may come off the printing cylinder when the printing form is removed, as the adhesion may be equally strong on both sides. Also, damages to the surface carrying the printing form will likely occur upon removal or replacement of the printing form in case the adhesion is strong, thereby reducing the lifetime of the adhesive printing form attachment layer. Further, if the adhesion is not strong enough, the printing form may come off the printing cylinder during operation. In addition, the presence of microspheres may deteriorate the adhesive properties of the layer and may lead to irregularities on the surface, which will transpose through the printing form, thereby potentially reducing print quality and/or causing offset.

BRIEF SUMMARY OF THE DISCLOSURE

The present disclosure aims at providing a novel adhesive printing form attachment layer that is able to provide for the reliable adhesive attachment of a printing form during a printing process to a printing cylinder, as well as a method for its manufacture. The adhesive printing form attachment layer is aimed at overcoming one or more drawbacks of prior art adhesive printing form attachment layers, and is in particular characterized by achieving improvements in one or more of the following aspects as compared to prior art adhesive printing form attachment layers:

High adhesion (stickiness) and simultaneously high integrity and strength;
Improved durability and lifetime;
Improved printing quality over a large number of prints with one printing form and/or after re-use with a large number of printing forms;
Easy removal of residues of printing ink and/or parts of the printing form; and
The ability of a sufficiently strong attachment to the printing cylinder.

Other and further advantages of the present disclosure will become more apparent in view of the following description.

The present inventors have found that one or more of the problems underlying the present disclosure can be solved by improving the composition and structure of the adhesive printing form attachment layer ("APFAL"), in particular by improving the composition of the permanently sticky (or adhesive) layer that serves to receive and fix the printing form (i.e., printing plate), and providing it on a support. Unless otherwise defined, the terms "support" and "substrate" are used as synonyms.

The connection of the APFAL to the printing cylinder is via a substrate layer on which the permanently sticky layer ("PSL") is provided. This allows obtaining sufficiently high stickiness on the side that serves to attach the printing form and also allows obtaining high strength and integrity throughout the PSL, while also ensuring a secure connection to the substrate.

The present disclosure provides the following aspects:

1. Adhesive printing form attachment layer comprising a support, and a permanently sticky layer suitable for receiving a printing form and fixing a printing form during a printing operation provided on the support, wherein the permanently sticky layer comprises a crosslinked structure obtained by crosslinking a crosslinkable composition comprising at least one polyurethane-based polymeric compound that has two or more crosslinkable groups, which are preferably ethylenically unsaturated groups.

2. The adhesive printing form attachment layer according to aspect 1, wherein the at least one polyurethane-based polymeric compound
   i. is represented by formula (I); or
   ii. is represented by formula (II); or
   iii. has a polyurethane backbone obtainable by reacting a tri- or higher functional isocyanate with a diol; or
   iv. has a polyurethane backbone obtainable by reacting a tri- or higher functional polyol with a diisocyanate;

$$R^3-OC(O)-NH-R^1-[NH-C(O)-O-R^2-O-C(O)-NH-R^1]_n-NH-C(O)O-R^4 \quad (I)$$

wherein
$R^3$ represents an organic group comprising a crosslinkable group, preferably an ethylenically unsaturated group;
$R^4$ represents an organic group comprising a crosslinkable group, preferably an ethylenically unsaturated group;
$R^3$ and $R^4$ may be the same or different from each other;
n is an integer of 1 to 1000;
$R^1$ is a divalent linking group, and in case there are multiple $R^1$, the multiple $R^1$ may be the same or different from each other; and
$R^2$ is a divalent linking groups, in case there are multiple $R^2$, the multiple $R^2$ may be the same or different from each other;

$$JY_m \quad (II)$$

wherein J is an m-valent organic group, m is an integer of 2 to 100, such as from 2 to 4, and each of the multiple Y, which may be the same or different from each other, is a group represented by $$R^3-OC(O)-NH-R^1-[NH-C(O)-O-R^2-O-C(O)-NH-R^1]_n-NH-C(O)O-$$

or $$-OC(O)-NH-R^1-[NH-C(O)-O-R^2-O-C(O)-NH-R^1]_n-NH-C(O)O-R^4,$$

wherein $R^1$, $R^2$, $R^3$, $R^4$ and n are as defined above for formula (I).

3. The adhesive printing form attachment layer according to aspect 1 or 2, wherein the at least one polyurethane-based polymeric compound having two or more crosslinkable groups is obtainable by modifying a polyurethane compound such as to contain two or more crosslinkable groups, the polyurethane compound being modified being a reaction product of a) a two- or higher functional polyol and a tri- or higher functional isocyanate compound;
   b) a tri- or higher functional polyol and a di- or higher functional isocyanate compound; or
   c) a diol and a diisocyanate.

4. Adhesive printing form attachment layer according to aspect 2 or 3, wherein in the compounds of formula (I) and (II), $R^1$ and/or $R^2$ are selected from the group consisting of divalent linking groups having a molecular weight of 200 or more, such as 500 or more or 1000 or more, and optionally 10,000 or less, such as 8,000 or less or 6,000 or less.

5. Adhesive printing form attachment layer according to any of aspects 2 to 4, wherein the two or more crosslinkable groups are represented by formula (III)

$$CH_2=C(X)-C(O)O-L \quad (III)$$

wherein X is hydrogen or a methyl group, and L is a divalent connecting group binding the group of formula (III) to the remainder of the polyurethane-based polymeric compound, and wherein preferably in the compound of formula (I) or (II), both of $R^3$ and $R^4$ contain an ethylenically unsaturated group of formula (III).

6. Adhesive printing form attachment layer according to any one of aspects 1 to 5, wherein the polyurethane based polymeric compound has a repeating unit containing a group selected from the group consisting of
   (i) homopolymers and copolymers of two or more ethylenically unsaturated compounds, preferably selected from the group consisting of styrenes, alkenes and polyenes having 2 to 12 carbon atoms and cycloalkenes having 3 to 12 carbon atoms, such as ethylene, propylene, n-butene, isobutene, 1-pentene, 2-pentene, 2-methyl-but-1-ene, 1,3-butadiene, 1,3-, 1,4- and 1,5-hexadiene, styrene, and α-methyl styrene, wherein the homopolymers and copolymers of polyenes may be hydrogenated or not hydrogenated;
   (ii) a polyether polyol, or
   (iii) a polyester polyol;
and wherein preferably in formula (I) or (II) one or both of $R^1$ and /or $R^2$ represent a polymeric group selected from the above (i), (ii) and (iii).

7. Adhesive printing form attachment layer according to aspect 6, wherein in group (i) the homopolymers and copolymers of two or more ethylenically unsaturated compounds are selected from the group consisting of 2-methyl-1,3-butadiene, wherein the homopolymers and copolymers of 2-methyl-1,3-butadiene may be hydrogenated or not hydrogenated.

8. Adhesive printing form attachment layer according to aspect 6 or 7, wherein the polymeric group (i), (ii) or (iii) has a weight average molecular weight of from 500 to 10,000, preferably from 1,000 to 5,000.

9. Adhesive printing form attachment layer according to any one of aspects 2 to 8, wherein in formula (I) and (II), one of $R^1$ and $R^2$, preferably $R^2$, represents a polymeric group as defined in aspect 6, which furthermore is preferably a hydrogenated polyene, such as hydrogenated polybutadiene, and the other one of $R^1$ and $R^2$ is a non-polymeric group having molecular weight of less than 500, which is preferably an aromatic group having 6 to 20 carbon atoms or an aliphatic group having from 2 to 20 carbon atoms, such as TDI, MDI, BDI, HDI, TMDI, ELDI, MLDI, IPDI and 1,4-Cyclohexane diisocyanate.

10. Adhesive printing form attachment layer according to any one of aspects 1 to 9, wherein the crosslinkable composition further comprises a (meth)acrylate compound not containing a —NHC(O)O— linkage, which is preferably one or more selected from the group consisting of (meth) acrylic monomers represented by formula (A-1), (meth) acrylic monomers represented by formula (A-2), (meth) acrylic monomers represented by formula (A-3) and (meth) acrylic monomers represented by formula (A-4):

$$CH_2=CHX-C(O)OR^5 \quad (A\text{-}1)$$

wherein X is H or $CH_3$, and $R^5$ is H or an organic group having 1-18 carbon atoms;

$$CH_2=CHX'-C(O)OR^6OC(O)CHX'=CH_2 \quad (A\text{-}2)$$

wherein X' is independently H or $CH_3$, and $R^6$ is a divalent group having 2 to 18 carbon atoms;

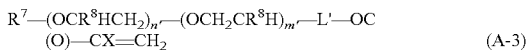

$$R^7-(OCR^8HCH_2)_{n'}-(OCH_2CR^8H)_{m'}-L'-OC(O)-CX=CH_2 \quad (A\text{-}3)$$

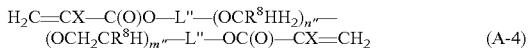

$$H_2C=CX-C(O)O-L''-(OCR^8HH_2)_{n''}-(OCH_2CR^8H)_{m''}-L''-OC(O)-CX=CH_2 \quad (A\text{-}4)$$

wherein $R^7$ is hydrogen or a C1-6 alkyl group, X is H or $CH_3$, $R^8$ is H or $CH_3$, m' and m" each independently is an integer from 0 to 100, n' and n" each independently is an integer from 0 to 100, with the proviso that each of n'+m' and n"+m" is independently from 2 to 100, and L' and L" each independently is a single bond or a divalent linking group, preferably a single bond or a C1-6 alkylene group.

11. Adhesive printing form attachment layer according to any one of aspects 1 to 10, wherein the adhesive layer is provided on a support, the support preferably being a polymer film, such as a film of polyethylene terephthalate ("PET"), polyvinyl chloride ("PVC"), polyethylene ("PE"), polyamide ("PA"), or polypropylene ("PP").

12. Method for the preparation of an adhesive printing form attachment layer according to any one of aspects 1 to 11, the method comprising at least the following steps
    (1) Providing a crosslinkable composition layer on a translucent release layer, wherein the translucent release layer is preferably a film made of PE, PP, PVC or PET and preferably has a thickness in the range of 100 to 300 µm, and the crosslinkable composition layer preferably has a thickness of 250 to 500 µm;
    (2) Providing translucent support layer on the crosslinkable composition layer to provide a layered structure comprising in this order the translucent release layer, the crosslinkable composition layer and the translucent support layer, wherein the translucent support layer preferably has a thickness in the range of 75 to 300 µm;
    (3) Exposing the layered structure to radiation, preferably to UV irradiation, in a first irradiation step to initiate a crosslinking reaction in the crosslinkable composition layer and to thereby form a partially cross-linked layer, wherein the irradiation occurs from one or both sides of the layered structure, preferably from only one side, more preferably from the translucent support layer side;
    (4) Removing the translucent release layer from the layered structure, preferably within 20 minutes, more preferably within 10 minutes and most preferably within 5 minutes after the irradiation of step (3), and quenching the cross-linking reaction of the partially cross-linked layer at the surface from which the translucent release layer has been removed, wherein the quenching occurs when the translucent release layer is removed and the surface of the partially cross-linked layer comes into contact with molecular oxygen and/or is cooled and/or is exposed to moisture, preferably the quenching is effected by bringing the surface of the partially cross-linked layer that has been exposed by the removal of the release layer into contact with air; and
    (5) Exposing the partially cross-linked layer to radiation, preferably to UV irradiation, in a second irradiation step and to thereby form the permanently sticky layer, wherein the irradiation occurs from both sides or from one side of the layered structure;

wherein translucent means that the material is able to transmit electromagnetic radiation in the range of 250 to 750 nm with a luminous transmittance of at least 50%, determined on a sample of a material having a thickness of 1 mm according to ASTM D1003-07.

13. Method according to aspect 12, wherein UV irradiation is used and the crosslinkable composition layer contains a UV initiator, preferably two UV initiators with sensitivities towards different wavelengths and the UV initiator is preferably selected from the group comprising or consisting of benzil dimethyl ketal, benzoin isobutyl ether, benzophenone, 2,2-diethoxyacetophenone, cyclohexyl phenyl ketone, 1-hydroxy-cyclohexyl-phenyl-ketone, mono-acylphosphine oxides and di-acylphosphine oxides, such as bis(2,4,6-trimethylbenzoyl)-phenylphosphineoxide, wherein the concentration of UV initiator preferably can range from 0.5 to 3 wt %, more preferably from 1 to 2 wt %, relative to the total weight of the crosslinkable composition excluding optional solvents.

14. Method according to aspect 12 or 13, wherein the UV irradiation in step (3) is in the UV-A range of 315 to 400 nm and is conducted for 30 to 240 seconds at illumination intensities of 10 to 150 W/m².

15. Method according to any one of aspects 12 to 14, wherein the dosage of UV irradiation is in the range of 1000 to 20000 Ws/m² and the crosslinkable composition layer has a thickness in the range of 250 to 500 µm.

16. Method according to any one of aspects 12 to 15, wherein two UV initiators with sensitivities towards different wavelengths are being used, and the first irradiation in step (3) and the second irradiation in step (5) are performed at a different wavelength to only activate one UV initiator in each step.

17. Method according to any one of aspects 12 to 16, wherein the permanently sticky layer exhibits a crosslinking gradient in which the crosslinking density increases from the side where the release layer was provided and where the reaction was quenched towards the center determined by analyzing the adhesiveness over the thickness of the permanently sticky layer by Atomic Force Microscopy performed on a sample area of 1×1 µm with 512×512 measurement points per picture using a line frequency of 0.4 Hz with a duration of 12 minutes per picture.

18. Method according to any one of aspects 12 to 17, wherein the permanently sticky layer exhibits one, preferably two, more preferably all three of the following features:
    (a) The average value of the adhesion over 20% in thickness direction, starting from the surface of the crosslinked permanently sticky layer opposite to the translucent support layer, is lower than in the center of the permanently sticky layer in thickness direction, preferably by 10 nN or more, more preferably by 15 nN or more, such as 20 nN or more;
    (b) The average value of the adhesion over each of the outer 20% in thickness direction, starting from the translucent support layer or the opposite surface, respectively, of the permanently sticky layer, is lower than the average value over the 60% in thickness direction centered around the center of the permanently sticky layer, preferably each by 5 nN or more, such as 10 nN or more; and/or (c) The average value of the adhesion over 20% in thickness direction, starting from the surface opposite the translucent support layer, is lower than the average value of the adhesion over 20% in thickness direction starting from the translucent support layer, preferably by 5 nN or more, such as 10 nN or more;

determined by Atomic Force Microscopy performed on a sample area of 1×1 μm with 512×512 measurement points per picture using a line frequency of 0.4 Hz with a duration of 12 minutes per picture.

19. Method according to any one of aspects 12 to 18, wherein the permanently sticky layer exhibits an adhesion in any region in thickness direction not lower than 60 nN, preferably not lower than 65 nN, more preferably not lower than 70 nN and most preferably not lower than 75 nN determined by Atomic Force Microscopy performed on a sample area of 1×1 μm with 512×512 measurement points per picture using a line frequency of 0.4 Hz with a duration of 12 minutes per picture.

20. Adhesive printing form attachment layer obtainable by the method according to any one of aspects 12 to 19.

21. Method for producing a printing form attachment layer, the method comprising providing a crosslinkable composition as defined in any one of aspects to 1 to 10 on a support, and crosslinking the crosslinkable composition, preferably by heat or radiation.

22. Printing form attachment layer obtainable by the method according to aspect 21.

23. Printing cylinder comprising a printing form attachment layer according to any one of aspects 1 to 11 or 22; or set of printing cylinders each comprising a printing form attachment layer according to any one of aspects 1 to 11 or 22.

24. Method of use of a printing form attachment layer according to any one of aspects 1 to 11 or 22, wherein the method comprises the step of fixing a flexographic printing plate during a printing operation on a printing cylinder.

25. Method of operating a printing machine, the method comprising
Providing a printing form attachment layer according to any one of aspects 1 to 11 and 22 on a printing cylinder, the permanently sticky layer being provided radially outwards;
Conducting printing using the printing form attached to the printing form attachment layer;
Replacing the used printing form by a new printing form and conducting printing with the new printing form, once or several times;
Cleaning the permanently sticky layer using a solvent; and
Attaching a printing form to the printing cylinder via the cleaned permanently sticky layer, and conducting printing.

DETAILED DESCRIPTION OF THE DISCLOSURE

In the present invention, all parameters and product properties relate to those measured under standard conditions (25° C., 105 Pa) unless stated otherwise.

All physical parameters can be determined by standard methods in the art and/or the following detailed description. In case of discrepancy between a standard method and a method described below, the present description prevails.

Whenever a range is expressed as "from x to y", or the synonymous expression "x-y", the end points of the range (i.e., the value x and the value y) are included. The range is thus synonymous with the expression "x or higher, but y or lower".

As used herein, the indefinite article "a" indicates one as well as more than one and does not necessarily limit its reference noun to the singular.

The term "about" means that the amount or value in question may be the specific value designated or some other value within a range of ±5% of the indicated value. As such, for instance the phrase "about 100" denotes a range of 100±5.

The term "and/or" means that either all or only one of the elements indicated is present. For instance, "a and/or b" denotes "only a", or "only b", or "a and b together". In the case of "only a" the term also covers the possibility that b is absent, i.e., "only a, but not b".

The term "translucent" denotes that a material is able to transmit electromagnetic radiation in the range of 250 to 700 nm. The luminous transmittance of a translucent material is typically 50% or higher, such as 70% or higher or 80% or higher, at all wavelengths falling within the range from 250 to 700 nm, determined on a sample of a material having a thickness of 1 mm according to ASTM D1003-07 (Procedure A). "Translucent" materials also include transparent materials.

The term "crosslinkable composition" denotes a composition that is able to undergo a crosslinking reaction upon proper initiation, such as by irradiation with electromagnetic radiation or heat, preferably only upon irradiation with electromagnetic radiation having a wavelength of 350 nm or shorter, in the following also referred to as "UV." The term "crosslinked composition" denotes the composition that is obtained after the crosslinkable composition has undergone a crosslinking reaction.

The term "layer" denotes a material having a physical shape in which the extension in each of two directions that are orthogonal to each other (x,y) exceeds that in a third direction (z) that is orthogonal to each of the directions x any y by a factor of 10 or more, such as 100 or more, 500 or more or 1000 or more. The direction "z" may also be referred to as the thickness of the layer. The term "layer" also includes a sheet as a specific form of a layer.

The term "adhesive" denotes the ability of a material to provide a releasable connection to another material by adhesive force. In the present invention, the adverb "adhesive" and the adjective "adhesively", respectively, as used, e.g., for the description of the adhesive printing form attachment layer or the way a printing form is held on an adhesive printing form attachment layer during a printing operation, include the meanings "sticky" and "permanently sticky", as well as "tacky" or "permanently tacky".

The term "number average molecular weight" refers to a value obtained by a GPC method using a polystyrene standard. The term "weight average molecular weight" also refers to a value obtained by a GPC method using a polystyrene standard. When a molecular weight is specified for a polymeric compound that in fact has a molecular weight distribution without indicating whether the weight average or number average weight is referred to, generally and as default the weight average molecular weight is referred to.

The term "(meth)acrylic monomer" denotes esters of acrylic acid and methacrylic acid, such as alkyl esters wherein the alkyl group has 1 to 18 carbon atoms, as well as methacrylic acid and acrylic acid.

In the sense of the present disclosure, a printing form attachment layer ("APFAL") is a structure that is able to provide a support for a printing form (i.e., printing plate), in particular a flexographic printing plate, during a printing process when mounted on a printing cylinder (printing sleeve). The APFAL layer has a permanently sticky layer ("PSL") comprising a crosslinked structure that is able to fix the printing plate by adhesive force due to its inherent stickiness, and a substrate layer. During use, the substrate layer is oriented towards the printing cylinder (printing sleeve), and it may be provided on the printing cylinder (sleeve) directly or via an intermediate layer, such as a cushioning layer.

A "main contact area in which the PSL is in direct contact with the substrate" means that 90% or more, such as 100%, of one surface of the PSL, i.e., the plane in x-y-direction, is in direct contact with the substrate.

The present inventor has duly studied the characteristics necessary for an APFAL, and has completed the present disclosure based on the findings that (a) providing the PSL on a support provides for a greater freedom in the composition of the PSL and in its properties, and (b) a PSL based on a crosslinked structure obtainable by crosslinking a crosslinkable composition comprising at least one polyurethane-based polymeric compound that has two or more crosslinkable groups, which are preferably ethylenically unsaturated groups, and two or more —NHC(O)O— linkages allows obtaining an APFAL having the required balance of properties, including high adhesion/stickiness of the PSL, good cohesion of the PSL, structural integrity of the PSL and the APFAL, easy attachment and removal of the APFAL to and from a printing cylinder (also known as printing sleeve), and at the same time easy removal of stains and restoration of high stickiness by a simple cleaning operation using a solvent.

The APFAL of the present disclosure comprises at least the PSL and the substrate, and may consist of these two layers. Optionally, a cushioning layer may be provided on the substrate surface opposite the PSL. Each of these components will be described in more detail below.

Permanently Sticky Layer (PSL)

The PSL is suitable for receiving a printing form and fixing a printing form during a printing operation, and is provided on the support. The PSL comprises a crosslinked structure that is obtained by crosslinking a crosslinkable composition (CC). The PSL may have a main contact area in which the PSL is in direct contact with the substrate. In embodiments, the permanently sticky layer exhibits a surface stickiness of at least 400 gram as measured by ASTM standard D-2979-95.

Crosslinkable Composition (CC)

The crosslinkable composition comprises at least one polyurethane-based polymeric compound (PBPC) that has two or more crosslinkable groups, which are preferably ethylenically unsaturated groups. As the PBPC is polyurethane-based, it comprises two or more —NHC(O)O— linkages (urethane linkages) as obtainable by reaction of a hydroxyl group and an isocyanate group. The CC may additionally comprise one or more of additional crosslinkable compounds such as monomers, which may, e.g., be (meth)acrylic monomers, and may also contain a thermal or photosensitive polymerization initiator for initiating a crosslinking reaction. The CC may also contain a solvent, a polymerization inhibitor to avoid premature crosslinking, a plasticizer, a rheology modifier, a desiccant or similar, as known to the person skilled in the art.

Polyurethane-Based Polymeric Compound with Two or More Crosslinkable Groups (PBPC)

The CC comprises the PBPC, and typically the amount of the PBPC is 50% by mass or more, such as 60% by mass or more, 70% by mass or more, or 80% by mass or more, e.g., 85% by mass or more or 90% by mass or more, of the total weight of the CC excluding any solvent, if present.

The PBPC is polyurethane-based, which means that it is formed by reaction of a polyol and a polyisocyanate, e.g., by reaction of a diol and a diisocyanate. The reaction between a hydroxyl group and an isocyanate group forms an —NHC(O)O— linkage, and at least two NHC(O)O-linkages are formed if a polyol is reacted with a polyisocyanate. This reaction is generally known in the art to produce polyurethanes (PU).

In addition to the at least two —NHC(O)O— linkages, the PBPC comprises at least two crosslinkable groups. These groups can be introduced into a polyurethane-based polymer by forming a polyurethane polymer first, and then modifying the polyurethane polymer by reacting the polyurethane polymer with a compound (modifying compound) that is capable of introducing the crosslinkable group into the polyurethane. Such a reaction can be performed by reacting the modifying compound with unconsumed 2ydroxyl and/or isocyanate groups, which are present at the chain ends of a polyurethane polymer. For instance, if the polyurethane polymer is a linear polyurethane polymer derived from the reaction of a diol and a diisocyanate, the introduction of the reactive group, such as an ethylenically unsaturated group, can be achieved by reacting the polyurethane polymer with a modifying compound having a polymerizable group and either one of an isocyanate group and a hydroxyl group, or both. For instance, a terminal isocyanate group may be reacted with a hydroxyl-containing (meth)acrylate compound to introduce an ethylenically unsaturated group. Such a modification is effected to such an extent that at least two crosslinkable groups are introduced. This can be achieved by using the same type of reaction with the same modifying compound in case of a polyurethane polymer having at least two groups (e.g., two terminal 2ydroxyl groups of the polyurethane polymer) that are reactive with the modifying compound in a molecule, and in this case there are used at least two equivalents of the modifying compound relative to one equivalent of the non-modified polymer. Of course, it is also possible to use two or more different modifying compounds that are reactive with two or more different groups present on the non-modified polymer.

Alternatively, the crosslinkable groups can be introduced into the polyurethane polymer by using a suitable starting compound for the polyurethane polymer synthesis, such as a polyol (e.g., a diol or triol) and/or a polyisocyanate (such as a diisocyanate or triisocyanate) having one or more crosslinkable groups. These groups then may remain unreacted during the formation of the polyurethane polymer, and may subsequently undergo a crosslinking reaction upon proper initiation, e.g., radically.

The crosslinkable groups can be freely chosen, but are generally neither hydroxyl groups nor isocyanate groups, and of course also no —NHC(O)O groups. Preferably, the crosslinkable groups are capable of undergoing a crosslinking reaction by a radical or ionic pathway, preferably by a radical pathway. While thus the crosslinking groups can be chosen from those that are able to react with the same or another crosslinking group in another molecule of the PBPC, such as epoxy groups or alcohol/carboxylic ester combinations to form an ester bond, the crosslinkable groups are preferably ethylenically unsaturated groups. The reason for this is that upon proper initiation the ethylenically unsaturated groups react via a radical mechanism, and are also able to react to some extent with the polymer backbone of the PBPC in a radical chain reaction. This is believed to be preferable because in this way no exact alignment of reactive groups needs to be achieved, as the radical reaction is able to form a wide variety of crosslinks upon proper initiation.

In a preferred embodiment, the crosslinkable groups are obtained by modifying a PU precursor compound forming the polyurethane backbone of the PBPC with a modifying compound having an ethylenically unsaturated group, which is preferably a (meth)acrylate compound. In such a case, the two or more crosslinkable groups such as $R^3$ and $R^4$ in formula (I) described below can include a structure represented by formula (III), or $R^3$ and $R^4$ in formula (I) are represented by formula (III):

$$CH_2=C(X)-C(O)O-L \quad (III)$$

wherein X is hydrogen or a methyl group, and L is a divalent connecting group binding the group of formula (III) to the remainder of the polyurethane-based polymeric compound. L is not particularly limited, but is typically an organic group having 1 to 18 or 1 to 12 carbon atoms, such as an alkylene group having 1 to 18 carbon atoms, preferably having 1 to 12 carbon atoms, more preferably having 1 to 6 carbon atoms. The connection to the polyurethane backbone can then be achieved by reacting a modifying compound of formula $CH_2=C(X)-C(O)O-L-OH$ or $CH_2=C(X)-C(O)O-L-NCO$ with a polyurethane compound having OH or NCO groups available for reaction, respectively.

The polyol and the polyisocyanate used for the polyurethane backbone of the PBPC are not particularly limited. In one embodiment, the PBPC is based on a linear polyurethane from one or more diols and one or more diisocyanates. In one embodiment thereof, the resulting PBPC conforms to formula (I):

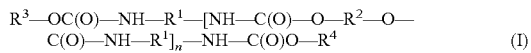

$$R^3-OC(O)-NH-R^1-[NH-C(O)-O-R^2-O-C(O)-NH-R^1]_n-NH-C(O)O-R^4 \quad (I)$$

wherein
$R^3$ represents an organic group comprising a crosslinkable group, preferably an ethylenically unsaturated group, such as represented by formula (III),
$R^4$ represents an organic group comprising a crosslinkable group, preferably an ethylenically unsaturated group, such as represented by formula (III),
$R^3$ and $R^4$ may be the same or different from each other,
n is an integer of 1 to 500,
$R^1$ is a divalent linking group, and in case there are multiple $R^1$, the multiple $R^1$ may be the same or different from each other, and
$R^2$ is a divalent linking group, and in case there are multiple $R^2$, the multiple $R^2$ may be the same or different from each other.

In the above formula (I), $R^1$ is the moiety derived from the one or more diisocyanate, and $R^2$ is the moiety derived from the one or more diols, and $R^1$ and/or $R^2$ may derive from the diols and the diisocyanates described below. The variable n denotes the number of repeating polyurethane units, and denotes an integer of 1 to 1000, typically 2 or more, 5 or more, 10 or more, or 15 or more, but 1000 or less, 800 or less, 600 or less, 500 or less, 400 or less, or 300 or less, but can also be as low as 200 or less, 150 or less or 100 or less. In particular when high molecular weight polyols and/or isocyanates are used, n may also be 80 or less or 50 or less, such as 40 or less or 30 or less.

In case of multiple $R^1$, these may by the same, which means that the PU backbone of the PBPC derives from only one diol. However, it is also possible to use a mixture of two or more diols in the synthesis of the PU backbone of the PBPC, and in this case the multiple $R^1$ are different from each other.

In case of multiple $R^2$, these may by the same, which means that the PU backbone of the PBPC derives from only one diisocyanate. However, it is also possible to use a mixture of two or more diisocyanates in the synthesis of the PU backbone of the PBPC, and in this case the multiple $R^2$ are different from each other.

It follows that the PU backbone of the PBPC may be obtained from one diol and one diisocyanate, may be obtained from a combination of two or more diols with one diisocyanate, may be obtained from a combination of two or more diisocyanates with one diol, and may be obtained from a combination of two or more diisocyanates with two or more diols.

The diol and the diisocyanate used for preparing the PU that, e.g., acts as precursor for the PBPC (prior to introduction of crosslinkable groups) and that provide the $O-R^2-O$ moiety and the $C(O)-NH-R^1-NH-C(O)$ moiety of the PBPC of formula (I) are not particularly limited, and can be chosen freely from those known in the art. The diol polyol and/or the diisocyanate each may or may not include urethane linkages $-OC(O)NH-$ in its molecule, and in one embodiment neither of the diol and the diisocyanate contain a urethane linkage in its molecule prior to their reaction to form the PU.

Diols include small molecule diols having a molecular weight of 500 or less, such as ethylene glycol and propylene glycol, but also large diols having a molecular weight of more than 500 or more or 600 or more or 1000 or more, but generally 10,000 or less, such as 8,000 or less or 6,000 or less, e.g., 5,000 or less, in order to maintain the PU characteristics. Here, the molecular weight refers to the weight average molecular weight in case of polymeric compounds having a molecular weight distribution.

Examples thereof include homopolymers and copolymers of two or more ethylenically unsaturated compounds, preferably selected from the group consisting of styrenes, alkenes and polyenes having 2 to 12 carbon atoms and cycloalkenes having 3 to 12 carbon atoms, such as ethylene, propylene, n-butene, isobutene, 1-pentene, 2-pentene, 2-methyl-but-1-ene, 1,3-butadiene, 1,3-, 1,4- and 1,5-hexadiene, styrene, and a-methyl styrene and copolymers of these, which have been functionalized by providing two (usually terminal) hydroxy groups or isocyanate groups. An example is a homopolymer of ethylene, propylene, 1-butene, isobutylene, 2-methyl-1,3-butadiene and 1,3 butadiene, or a copolymer of or two or more of these, into which two hydroxyl groups have been terminally added. 2-methyl-1,3-butadiene is particularly preferred. A polymer derived from a polyene, such as polybutadiene, is typically hydrogenated before functionalizing it to provide for, e.g., two terminal hydroxy groups in order to make it less susceptible to decay, but in the context of the present invention also a non-hydrogenated polybutadiene can be used and subsequently functionalized to provide for, e.g., two terminal hydroxy groups, as it provides already reactive groups for a subsequent crosslinking reaction.

Further examples of large diols include polyether polyols and polyester polyols, of which polyether polyols are preferred in view of polyester polyols generally being more susceptible to hydrolysis and polyether polyols providing improved stickiness. Specific examples include poly(tetramethylene) glycol (PTMO), poly(propylene oxide) (PPO) glycol, and poly(ethylene) glycol (PEG). In both the polyester polyol and the polyether polyol, the number of repeating units is typically 50 or more, such as 100 or more or 200 or more, but generally 1000 or less, such as 800 or less.

The diisocyanate can equally be chosen from known diisocyanates for the production of PU, such as aromatic diisocyanates such as methylene diphenyl diisocyanate (MDI) and hydrided MDI in all stereoisomeric forms such as 2,2'-, 2,4' and 4,4'-; and toluene diisocyanate (TDI), of which all stereoisomers such as 2,4; and 2,6 can be used. Alternatively and preferably, non-aromatic (aliphatic) diisocyanates are used, as they can reduce environmental burden and are less likely to cause health hazards. Examples thereof include 1,4-Butanediisocyanate (BDI), 1,6-Hexamethylenediisocyanate (HDI), 2,2,4-Trimethyl hexamethylene diisocyanate (TMDI), Ethyl-2,6-diisocyanatohexanoate (ELDI) and Methyl-2,6-diisocyanatohexanoate (MLDI), Isophorone diisocyanate (IPDI), and 1,4-Cyclohexane diisocyanate, Lysine diisocyanate, etc.

Similar to the diol, the diisocyanate can also be a compound having a small (500 or less) or large molecular weight, such as having a molecular weight of more than 500, 600 or more or 1000 or more, but generally 10,000 or less, such as 8,000 or less or 6,000 or less, e.g., 5,000 or less, expressed as weight average molecular weight in case of a polymeric compound having a molecular weight distribution, in order to maintain the PU characteristics. In principle, these can be prepared by functionalizing a corresponding compound with two isocyanate groups or by introducing at two positions a group carrying an isocyanate group. Examples of compounds that can thus be modified include homopolymers and copolymers of two or more ethylenically unsaturated compounds, preferably selected from the group consisting of styrenes, alkenes and polyenes having 2 to 12 carbon atoms and cycloalkenes having 3 to 12 carbon atoms, such as ethylene, propylene, n-butene, isobutene, 1-pentene, 2-pentene, 2-methyl-but-1-ene, 1,3-butadiene, 1,3-, 1,4- and 1,5-hexadiene, 2-methyl-1,3-butadiene, styrene, and α-methyl styrene and copolymers of these, which have been functionalized by providing two (usually terminal) hydroxy groups or isocyanate groups. An example is a homopolymer of ethylene, propylene, 1-butene, isobutylene, 2-methyl-1, 3-butadiene and 1,3 butadiene, or a copolymer of or two or more of these, into which two hydroxyl groups have been terminally added. As set out above, 2-methyl-1,3-butadiene is particularly preferred. A polybutadiene is typically hydrogenated prior to functionalization in order to make it less susceptible to decay, but in the context of the present invention a non-hydrogenated polybutadiene can be used as it provides already reactive groups for a subsequent crosslinking reaction.

While thus both the diol and the diisocyanate can each be selected from small molecules and large molecules as defined above, in one embodiment one of the diol and the isocyanate is a small molecule (Mw 500 or less), and the other one is a large molecule (Mw more than 500, preferably 1,000 or more). In view of availability, it is preferably the polyol that is a large molecule.

Of course, it is also possible to use more than one diol and/or more than one diisocyanate. Also in this case, preferably at least one of the two or more diols or at least one of the two or more diisocyanates is a large compound having a Mw of 500 or more, such as 1,000 or more.

In one embodiment, the PBPC is represented by formula (II):

wherein J is an m-valent organic group, m is an integer of 2 to 100, such as from 2 to 6 or 3 to 6, and each Y, which may be the same or different, is a group represented by $R^3$—OC(O)—NH—$R^1$—[NH—C(O)—O—$R^2$—O—C(O)—NH—$R^1$]$_n$—NH—C(O)O— or —OC(O)—NH—$R^1$—[NH—C(O)—O—$R^2$—O—C(O)—NH—$R^1$]$_n$—NH—C(O)O—$R^4$, wherein $R^1$, $R^2$, $R^3$, $R^4$ and n are as defined above for formula (I).

Each of the m Y groups is bound to J via a direct bond. In case that m is 3 or more, the compound may have a star-like structure with radially extending PU chains Y. Such a compound can for example be prepared by preparing a linear PU oligomer, and then reacting a terminal isocyanate group thereof with a hydroxyl group present in J, or vice versa. In such a case, J may be derived from a polyol, such as glycerol or trimethylol propane, or a polyisocyanate. The use of a compound of formula (II) may allow for a higher rigidity of the material even prior to crosslinking. However, during the preparation of such a compound, care should be taken to avoid a too large degree of crosslinking, and this can generally be ensured by choosing proper mixing ratios (NCO/OH of less than 0.5 or more than 2.0), and by choosing appropriate reaction conditions, e.g., low concentrations in large amounts of solvents.

J is not particularly limited, and the compound from which J is derived can be any compound capable of forming a bond with Y. This can be achieved by any suitable reaction, but typically the compound of formula (II) can be prepared by reacting a compound of formula OCN—$R^1$—[NH—C(O)—O—$R^2$—O—C(O)—NH—$R^1$]$_n$—NCO or HO—[$R^2$—O—C(O)—NH—$R^1$—NH—C(O)O—]$_n$$R^2$—OH, wherein $R^1$, $R^2$, and n are as defined for formula (I) above, with a compound that has m functional groups reactive with an isocyanate group or hydroxyl group, respectively, followed by introducing the two or more crosslinkable groups (or introducing two or more groups each containing a crosslinkable group). For instance, a compound of formula OCN—$R^1$—[NH—C(O)—O—$R^2$—O—C(O)—NH—$R^1$]$_n$—NCO can be reacted with a compound having two, three or more (corresponding to m) hydroxyl groups, or a compound of formula HO—[$R^2$—O—C(O)—NH—$R^1$—NH—C(O)O—]$_n$$R^2$—OH can be reacted with a compound having two, three or more (corresponding to m) isocyanate groups, and the reaction products can then be reacted with a compound having a crosslinkable group and having reactivity with an isocyanate group or hydroxyl group, respectively. For instance, a compound of formula OCN—$R^1$—[NH—C(O)—O—$R^2$—O—C(O)—NH—$R^1$]$_n$—NCO can be reacted with a compound having m hydroxyl groups in order to form a compound of formula J-[O—C(O)NH—$R^1$—[NH—C(O)—O—$R^2$—O—C(O)—NH—$R^1$]$_n$—NCO]$_m$, and this can then be reacted with a compound having a crosslinkable group and reactivity with an NCO group, such as a hydroxy (meth) acrylate, to form the compound of formula J-[O—C(O)NH—$R^1$—[NH—C(O)—O—$R^2$—O—C(O)—NH—$R^1$]$_n$—NHC(O)O$R^4$]$_m$. An example of a compound of formula (II) is a compound represented by C(CH$_2$CH$_3$)(CH$_2$OZ)$_3$, wherein Z is $R^3$—OC(O)—NH—$R^1$—[NH—C(O)—O—$R^2$—O—C(O)—NH—$R^1$]$_n$—NH—C(O)—, for example the compound C(CH$_2$CH$_3$)(CH$_2$OC(O)—NH—[C$_6$H$_{12}$NH—C(O)—O—C$_4$H$_8$—O—C (O)—NH]$_{20}$—C$_6$H$_{12}$NH—C(O)OCH$_2$CH$_2$OC(O)C(=CH$_2$)CH$_3$)$_3$, as obtainable by preparing a PU by reacting 1,4 butanediol and 1,6 hexamethylene diisocyanate in an NCO/OH ratio of 2.0 or greater, reacting each hydroxy group of trimethylolpropane with a terminal NCO group on one side of the obtained PU again in an NCO/OH ratio of 2.0 or greater, and then reacting a terminal NCO group on the other side of the previously obtained PU with the hydroxy group of 2-hydroxyethyl methacrylate.

Alternatively, a more branched structure of the PU polymer backbone can be obtained by reacting tri- or higher functional isocyanate with a diol; or by reacting a tri- or higher functional polyol with a diisocyanate. In order to provide for two or more crosslinkable groups to form the PBPC, such as ethylenically unsaturated groups, the PU backbone may either be formed by using a diol, tri- or higher functional diol, diisocyanate or tri- or higher functional isocyanate, respectively, of which at least one already carries a crosslinkable group, or by modifying the obtained PU backbone polymer such as to provide for crosslinkable groups, e.g., by reacting at least two hydroxyl-terminated ends of a branched PU polymer with (meth)acrylic acid in order to form corresponding (meth)acrylic acid ester groups, or by reacting a double isocyanate-terminated PU with an hydroxyl-containing (meth)acrylate compound, such as 2-hydroxyethyl methacrylate. The term "modifying" thus implies a chemical reaction of a PU compound with one or more other molecules that have one or more crosslinkable groups, such as ethylenically unsaturated groups, so as to obtain a compound having a PU backbone and two or more crosslinkable groups. If said other compound has only one crosslinkable group, the compound of course needs to be employed in an amount of 2 moles or more relative to 1 mole of the PU compound.

In each case, the polyol and the polyisocyanate can be of synthetic origin, or can be of natural origin. Examples of polyols of natural origin include sugars and other carbohydrates having two or more hydroxy groups, or hydrogenated castor oil or a palm-oil-based polyester polyol.

Other Optional Components of the Crosslinkable Composition

In one embodiment, the crosslinkable composition optionally includes one or more of (meth)acrylic monomers, optionally one or more or thermal and/or UV initiators capable of initiating a crosslinking reaction, and optionally a solvent.

The one or more of (meth)acrylic monomers may improve stickiness and adhesion, and can generally be included in an amount of 30% by weight or less, such as 25% by weight or less or 20% by weight or less, relative to the total weight of the crosslinkable composition excluding the optional solvent. The lower limit is not particularly limited and may be 0, but typically 5% by weight or more, such as 10% by weight or more of (meth)acrylic monomer may be included. This of course also depends on the nature of the (meth)acrylic monomer.

In one embodiment, the (meth)acrylic monomers are selected from those whose homopolymer exhibits a glass transition temperature of 0° C. or lower, preferably −20° C. or lower. In another embodiment, the one or more (meth)acrylic monomers include at least one di- or higher functional (meth)acrylate. Examples of trifunctional (meth)acrylates include trimethylol propane trimethacrylate (TMPTMA) and trimethylol propane triacrylate (TMPTA).

In one preferred embodiment, the one or more (meth)acrylic monomer include at least one that is selected from those represented by formula (A-3) and (A-4):

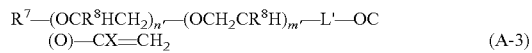

(A-3)

(A-4)

wherein R$^7$ is hydrogen or a C$_{1-6}$ alkyl group, X is H or CH$_3$, R$^8$ is H or CH$_3$, m' and m" each independently is an integer from 0 to 100, such as 1 to 50 or 2 to 30, n' and n" each independently is an integer from 0 to 100, such as 1 to 50 or 2 to 30, with the proviso that each of n'+m' and n"+m" is independently from 2 to 100, and L' and L" each independently is a single bond or a divalent linking group, preferably a single bond or a C$_{1-6}$ alkylene group such as methylene or ethylene.

The monomers of formula (A-3) and (A-4) are (meth)acrylate esters or di(meth)acrylate esters of polyethylene glycol or polypropylene glycol, or mixed poly(ethylene)(propylene)glycol. In case of an ester of a mixed poly(ethylene)(propylene)glycol (i.e., the case that neither n' nor m', or neither n" nor m" is 0), the respective ethylene oxide and propylene oxide can be present in block form, or can be distributed randomly.

The presence of a (meth)acrylate of formula (A-3) or (A-4) may improve the flexibility of the PSL. The presence of a (meth)acrylate of formula (A-3) or (A-4) is also believed to improve the oxygen permeability of the photopolymer composition. The (meth)acrylate of formula (A-3) or (A-4) is preferably contained in an amount of 0.5 to 10.0% by weight, relative to the total weight of the crosslinkable composition except for the optional solvent, such as from 1 to 5% by weight.

In one embodiment, the one or more (meth)acrylic monomers include one or more (meth)acrylic monomer(s) represented by formula (A-1), one or more meth)acrylic monomer(s) represented by formula (A-2), or one or more of each of the monomers of formula (A-1) and formula (A-2):

(A-1)

wherein X is H or CH$_3$, and R$^5$ is H or a monovalent organic group having 1-18 carbon atoms;

(A-2)

wherein X' is independently H or CH$_3$, and R$^6$ is a divalent organic group having 2 to 18 carbon atoms.

In formula (A-1), X is H or CH$_3$, preferably CH$_3$. R$^5$ is H or an organic group having 1-18 carbon atoms, preferably an aliphatic hydrocarbon group having 1-18 carbon atoms, and more preferably an aliphatic hydrocarbon group having 4 to 16 carbon atoms. The aliphatic hydrocarbon group can be a branched or straight alkyl group. Examples of monomers of formula (A-1) include methyl (meth)acrylate, butyl (meth)acrylate, hexyl (meth)acrylate, and lauryl (meth)acrylate.

In formula (A-2), X' is H or CH$_3$, preferably CH$_3$. R$^6$ is a divalent group having 2 to 18 carbon atoms, preferably a straight or branched alkylene group, more preferably having 3 to 12 carbon atoms. Examples include butylene glycol dimethacrylate (BGDMA) and diethylene glycol dimethacrylate.

In the above formulae (A-1) and (A-2), R$^5$ and R$^6$ are H or an organic group having the specified number of carbon atoms. Examples thereof include aliphatic groups, such as alkyl and alkylene groups, respectively. R$^5$ and R$^6$ may be unsubstituted or substituted. If substituted, they are preferably substituted with one or more, such as 1, 2 or 3, substituents selected from halogen (Cl, Br, I, preferably Cl or Br) hydroxy or isocyanato, preferably hydroxy or isocyanato. Examples of compounds of formulae (A-1) and (A-2) include hydroxypropyl (meth)acrylate, hydroxyethyl(meth) acrylate, hydroxybutyl(meth)acrylate, isocyanato ethyl (meth)acrylate, isocyanato propyl (meth)acrylate, diisocyanato ethyl(meth)acrylate, etc.

The total amount of the monomer of formula (A-1) and/or (A-2) is not particularly limited, but is preferably 3% by weight or more, such as 5% by weight or more or 7% by weight or more, and is preferably 25% by weight or less, such as 20% by weight or less, or 15% by weight or less, relative to the total weight of the crosslinkable composition, excluding the optional solvent.

The crosslinkable composition further preferably includes a compound capable of initiating a crosslinking reaction by generating an ion or a radical upon heating or irradiation. In a preferred embodiment, the compound is a UV initiator. The UV initiator can be selected from known UV initiators, such as benzil dimethyl ketal (IRGACURE® 651), benzoin isobutyl ether (BIBE), benzophenone and associated derivatives, 2,2-diethoxyacetophenone, cyclohexyl phenyl ketone and such derivatives (IRGACURE® 184), etc., mono and di-acylphosphine oxide derivatives (IRGACURE® 819), and similar substances. The most preferred photoinitiators are BIBE, IRGACURE® 184, and IRGACURE® 651. Most preferred is BIBE. The concentration of UV initiator can range from 0.5 to 3 weight %, but is preferably from 1 weight % to 2 weight %, relative to the total weight of the crosslinkable composition excluding the optional solvent. The UV initiator can be one compound, but also a combination of UV initiators can be used, e.g., with sensitivity towards different wavelengths.

The crosslinkable composition may optionally include a solvent. Such a solvent is preferably absent, as the evaporation of the solvent reduces the volume of the layer formed from the crosslinkable composition and makes a proper thickness adjustment more difficult. Evaporation of the solvent may also lead to a porous structure, which is not desired. If present, its amount is typically 50% by weight or less, preferably 25% by weight or less, such as 15% or 10% by weight or less. The solvent can be chosen from known organic solvents, such as protic and aprotic solvents and mixtures thereof. The solvent preferably has a boiling point of 75° C. or less at 105 Pa. In one embodiment, the solvent may be selected from ethers, alcohols, ketones and esters, such as acetone, methyl ethyl ketone, ethanol, methanol, isopropanol, acetic acid ethyl ester, acetic acid methyl ester, tetrahydrofuran, or diethyl ether.

Permanently Sticky Layer (PSL)

The PSL comprises a crosslinked structure that is obtained from the crosslinkable composition described above, typically by initiation using heat or radiation. While the PSL may contain other components besides the crosslinked structure obtained by crosslinking the crosslinkable composition, the crosslinked structure typically forms 8% by weight or more, such as 90% by weight or more or 95% by weight or more of the PSL. The PSL may also consist of the crosslinked structure. After crosslinking, the PSL exhibits permanently sticky properties.

The PSL is formed by providing the crosslinkable composition on a substrate as will be explained below, and then initiating the crosslinking reaction. The formation may also include heating the crosslinkable composition and/or the crosslinked structure in order to evaporate any solvent and/or unreacted monomer, if desired.

The thickness of the PSL is not particularly limited as long as the object of the present invention is achieved, but is typically 1.00 mm or less, preferably 0.90 mm or less, 0.80 mm or less, 0.70 mm or less, 0.60 mm or less, 0.50 mm or less, or 0.45 mm or less. The lower limit is not particularly limited, but can be 0.05 mm or more, such as 0.10 mm or more, 0.15 mm or more, or 0.20 mm or more, such as 0.25 mm or more.

The PSL preferably does not contain microspheres.

Support

The support (or substrate) on which the crosslinkable composition is provided and on which the crosslinking reaction is performed is not particularly limited, but is generally a film of, e.g., PET, PVC, PE, PA or PP. The thickness of the support is not particularly limited and depends on the intended purpose and desired structural integrity, but is preferably 50 to 800 μm, such as 100 to 300 μm.

The support surface to receive the crosslinkable composition may be roughened and/or treated with a primer, such as a silane coupling agent, to improve the bonding strength between the PSL and the support.

The support may be translucent. This allows manufacturing the APFAL by the method described below, in which the crosslinkable composition is crosslinked by irradiation (typically UV), and in which irradiation from either one or both sides of the support having the crosslinkable composition on one side can be employed.

The translucent substrate (support) layer may be as described below with reference to an illustrative method for the preparation of an APFAL of the present invention.

Illustrative Method for the Preparation of an Adhesive Printing Form Attachment Layer The method for the preparation of an adhesive printing form attachment layer according to the present invention may comprise at least the following steps (1)-(5):

(1) Providing a crosslinkable composition layer on a translucent release layer;
(2) Providing a translucent substrate layer on the crosslinkable composition layer to provide a layered structure comprising in this order the translucent release layer, the crosslinkable composition layer and the translucent substrate layer;
(3) Exposing the layered structure to radiation in a first irradiation step to initiate a crosslinking reaction in the crosslinkable composition layer and to thereby form a partially cross-linked layer;
(4) Removing the translucent release layer from the layered structure and quenching the cross-linking reaction of the partially cross-linked layer at the surface from which the translucent release layer has been removed;
(5) Exposing the partially cross-linked layer to radiation in a second irradiation step.

Each of these steps will now be described in more detail:

(1) Providing the Crosslinkable Composition on a Translucent Release Layer

The crosslinkable composition described above is provided on a translucent release layer. To this end, any conventional technique can be used. Given that the crosslinkable composition is generally a liquid at 20° C., it can be ejected from one or more nozzles onto the release layer that is provided, e.g., in a horizontal alignment. In order to decrease viscosity, the photopolymerizable composition may be heated, but preferably not higher than 65° C. in order to avoid premature heat-induced polymerization. If the viscosity of the crosslinkable composition is too high in order to allow the quick formation of a smooth surface, the temperature may be increased or a solvent be added in order to reduce viscosity. Additionally or alternatively, the layer of the crosslinkable composition may be made uniformly flat by using a conventional means, such as a doctor knife or squeegee. The thickness of the crosslinkable composition layer is not particularly limited, but is preferably in the range of 250 to 500 μm.

The translucent release layer is not particularly limited, but is generally a film of polymeric material having a suitable thickness such as to remain flexible. The release layer can be made of any material that can subsequently be released from the partially cured or cured crosslinkable composition, and suitable materials include PE, PP, PVC, PET, etc. The thickness of the release layer is not particularly limited, but the material should have sufficient strength and integrity in order to be able to support the photopolymerizable composition. In practice, a thickness in the range of 100-300 μm has been proven useful, such as a 200 μm PET film.

The release layer is translucent, which means that the visible light, and in particular UV light used for initiating the polymerization reaction of the crosslinkable composition, must be able to pass through the release layer, as defined above. The release layer thus does not need to be transparent, but it can also be transparent.

(2) Providing a Translucent Substrate Layer

After the crosslinkable composition has been provided on the release layer, a substrate (support) layer is provided on top of the photopolymerizable composition layer.

Since the substrate layer later forms the connection of the adhesive printing form attachment layer to the printing cylinder (directly or via a cushioning layer), it is generally preferable that the translucent substrate layer has some stability and strength in order to allow further handling. On the other hand, the substrate layer needs to be flexible enough in order to allow attachment to the curved surface of the printing cylinder (sleeve). The substrate layer is typically made from a polymeric material such as PE, PP, PVC, PET, etc. The thickness is not particularly limited, but a thickness in the range of 75-300 μm, has been proven useful, such as a 100 μm or 200 μm PET film.

The substrate layer needs in this method of manufacturing to be translucent, which means that the visible light, and in particular UV light used for initiating the crosslinking reaction of the crosslinkable composition, must be able to pass through the substrate layer, as defined above. The substrate layer may also be transparent.

The surface of the substrate layer in contact with the crosslinkable composition can be smooth, but is preferably roughened. Without wishing to be bound by theory, it is assumed that a roughened surface provides a greater specific surface area and hence allows obtaining a stronger bond between the PSL and the substrate layer. This can be beneficial in use, as this allows reducing the risk of the PSL being detached from the substrate layer at a later stage, e.g., during printing.

It is generally preferable that the layered structure of release layer, crosslinkable composition layer and substrate layer has uniform thickness, i.e., that the distance between the outer surface of the release layer and the outer surface of the substrate layer is about the same at all positions. This can for instance be achieved by leveling the thickness of the layered structure by pressing between two smooth plates that have been carefully aligned and/or worked in order to obtain a high planarity.

(3) Exposing the Layered Structure to Radiation in a First Irradiation Step

Next, the layered structure of release layer, crosslinkable composition and substrate layer is exposed to irradiation, typically UV irradiation, in order to initiate the polymerization reaction of the crosslinkable composition, in order to form a partially crosslinked layer.

The direction from which the photopolymerizable composition is irradiated is not limited, as both the release layer and the substrate layer are translucent. The irradiation may occur from only one side, which may be the side of the release layer or the side of the substrate layer, but it is also possible to irradiate from both sides. The latter may be preferable in order to achieve a more homogeneous reaction rate throughout the layer of the crosslinkable composition, but in order to reduce equipment costs, irradiation from one side only may also be preferred. In this case, the irradiation may occur from, e.g., the side of the release layer or from the side of the substrate layer. In case of irradiation from only one side, irradiation from the substrate layer side may be preferred, as thereby a high degree of crosslinking and thereby a strong bond to the substrate layer may be facilitated.

In this way of manufacturing the APFAL, it is important that in this step the UV irradiation is effected to such an extent that no full crosslinking reaction occurs. This can be secured by using UV irradiation of low intensity, or conducting the irradiation only for a short time. The UV irradiation can be in a suitable wavelength range depending on the UV initiator employed, such as in the range of UV-A radiation (315-400 nm). In practice, an irradiation time of 30-240 seconds has been proven useful such as from 60 to 180 seconds, at illumination intensities of about 10 to 150 W/m$^2$, such as from 20 to 80 W/m$^2$, e.g., 50 to 75 W/m$^2$.

However, the irradiation time may be shortened if a high intensity is used, and may be prolonged if a low intensity is used. The illumination time and intensity can be adjusted depending on the desired degree of crosslinking, the amount of UV-initiator, the thickness of the crosslinkable composition layer, etc. A suitable dosage of UV irradiation may thus be in the range from 1,000-20,000 Ws/m$^2$, such as 2,000-15,000 Ws/m$^2$ or 3,000-10,000 Ws/m$^2$. These values are typically suitable for a layer thickness of about 250-500 μm, and lower or higher values may be used in case the layer thickness is not within this range.

(4) Removing the Translucent Release Layer from the Layered Structure and Quenching the Cross-Linking Reaction of the Partially Cross-Linked Layer at the Surface from which the Translucent Release Layer has been Removed Then, the translucent release layer is removed, and the crosslinking reaction at the surface from which the release layer has been removed is quenched or inhibited.

As the crosslinking reaction initiated in step (3) is typically a self-propagating reaction, this step may need to be conducted relatively soon after the polymerization reaction has been started in step (3). In practice, a time window of up to 20 minutes, such as up to 10 minutes or up to 5 minutes from the end of the irradiation in step (3) has been proven practical, as during this time period the crosslinking reaction is not yet complete. The time of course also depends on the concentration of UV initiator and the intensity and duration of the first irradiation step, and the time until the translucent release layer is removed can be determined as desired by a skilled person in dependency of the composition of the crosslinkable composition, the used UV intensity and duration, and the desired properties of the surface of the crosslinkable compositions, e.g., with respect to the stickiness of the surface and the cohesiveness of the crosslinkable composition layer.

The quenching of the polymerization reaction occurs automatically when the release layer is removed and the surface of the partially crosslinked layer comes into contact with molecular oxygen as present in, e.g., air. The quenching of the crosslinking reaction may additionally be facilitated by cooling the surface or bringing the exposed surface into contact with moisture. Preferably, the quenching is effected by bringing the surface that has been exposed by the removal of the release layer into contact with air, as this is the easiest and most cost-efficient way to quench the reaction.

As the crosslinking reaction is quenched at the surface on which the release layer had been provided, the degree of crosslinking at this surface is lower as compared to the bulk of the crosslinkable layer. This provides for suitable adhesive properties (permanent stickiness), which facilitates the subsequent attachment of the printing form and its fixation during use. Also, as the reaction sites are no longer present after the reaction with, e.g., oxygen (quenching), the degree of crosslinking at the surface does not or does not increase greatly during subsequent second exposure as compared to the bulk of the layer, as no or fewer reaction sites for a subsequent crosslinking reaction are available.

(5) Exposing the Partially Cross-Linked Layer to a Second Irradiation Step

In the second irradiation step, the laminate structure of partially crosslinked layer and substrate (support) layer is subjected to a further irradiation. Thereby, in particular in the portions other than the surface or surface layer of the surface that was in contact with the (now removed) release layer, the reaction is completed.

The direction from which the partially crosslinked layer is irradiated in this step is not limited. The irradiation may occur from only one side, which may be the side where previously the release layer was provided, or from the side of the substrate layer, but it is also possible to irradiate from both sides.

The second irradiation step may need to be conducted such as to substantially complete the reaction. While similar conditions as in the first irradiation step may be employed, it should be ensured that the irradiation intensity and duration, e.g., with UV, is sufficient to achieve substantially complete crosslinking. It is also envisaged that the second irradiation is performed at a different wavelength as the first irradiation. If for instance a small amount of a UV initiator sensitive to a wavelength used in the first irradiation step is used, such a small amount may be able to induce only a low reaction rate, thereby allowing to control the formation of the partially crosslinked layer. A second UV initiator sensitive to another (necessarily shorter) wavelength may then be included, which is only activated in the second irradiation step. This may then lead to complete or near-complete curing the photopolymerizable composition, yet the crosslinking density would still be lower at the release layer side where the reaction had been quenched, e.g., due to the inhibitory action of oxygen and the reduced number of reaction sites that are available for a further crosslinking reaction.

As at the surface or in the surface layer that was in contact with the release layer the reaction had previously been quenched and there are no or fewer remaining reactive sites that could react in such a second irradiation step due to their previous reaction with, e.g., molecular oxygen, the molecular weight increases only, or to a greater extent, in the portions other than at the surface or in the surface layer that was in contact with the release layer. The crosslinking density and/or adhesion value in an AFM measurement after the second irradiation is thus larger in the portions of the crosslinkable layer other than at the surface or in the surface layer that was in contact with the release layer. This is referred to in the present invention as crosslinking gradient, meaning that the crosslinking density (as represented by the adhesion in an AFM measurement) of the PSL increases from the side where the release layer was provided and where the reaction was quenched (low crosslinking density, leading to lower stickiness) towards the center (higher crosslinking density, and thereby higher strength and stickiness). Thereby, high strength and cohesion of the layer in the portions other than at the surface or in the surface layer that was in contact with the release layer can be secured. Further, a high bonding strength to the translucent substrate is secured. All of these contribute to the lifetime of the adhesive printing form attachment layer, as a cohesive failure of the layer or release from the substrate layer is prevented.

The presence of such a crosslinking gradient may be determined by analyzing the adhesiveness over the thickness of the PSL by an AFM (Atomic Force Microscopy, also known as Scanning Force Microscopy, SFM) method. Herein, the adhesion measurement can be performed with any instrument known in the art, such as a Bruker Dimension ICON (equipped with hardware as available on Dec. 1, 2018, including a conical shaped tip having a radius ranging from 2 (tip) to 20 nm (base)), using the Nanoscope Analysis 9.4 software in the Peak Force QNM mode, performed on a sample area of 1×1 μm with 512×512 measurement points per picture, using a line frequency of 0.4 Hz (duration: approx. 12 minutes per picture), and analyzing the data using Bearing Analysis. Herein, the distribution of the measured values is analyzed as to extreme values and it is assessed from which lower or upper threshold the measured values are associated with the main material, respectively whether they are associated with a material that is present in a minor amount (not representative for the main material). A reliable determination of the modulus of the main material is obtained when the 30-70% values are seen as representing the main material (i.e., only the values falling within the range of 30-70% of the maximum value obtained are considered).

In one embodiment, the PSL of the APFAL of the present invention exhibits in an AFM measurement one, preferably two, more preferably all three of the following features:
(a) The average value of the adhesion over 20% in thickness direction, starting from the surface of the crosslinked PSL layer opposite to the translucent substrate, is lower than in the center of the PSL in thickness direction, preferably by 10 nN or more, more preferably by 15 nN or more, such as 20 nN or more;

(b) The average value of the adhesion over each of the outer 20% in thickness direction, starting from the translucent substrate or the opposite surface, respectively, of the PSL, is lower than the average value over the 60% in thickness direction centered around the center of the PSL, preferably each by 5 nN or more, such as 10 nN or more; and/or (c) The average value of the adhesion over 20% in thickness direction, starting from the surface opposite the translucent substrate, is lower than the average value of the adhesion over 20% in thickness direction starting from the translucent substrate, preferably by 5 nN or more, such as 10 nN or more.

A PSL satisfying one, two or all three of these requirements is illustrative for a PSL having a crosslinking gradient in the sense of the present invention, and is thus a specific embodiment thereof. It is further preferred that the adhesion in any region in thickness direction of the PSL is not lower than 60 nN, preferably not lower than 65 nN or 70 nN, such as equal to or higher than 75 nN, and this can be combined with any of the above features (a), (b) and (c).

Due to satisfying the above features (a), (b) and/or (c), it can be ensured that the adhesion on the surface opposite the translucent substrate, which is intended for receiving and holding the printing form, has a lower adhesion than the center of the PSL and the portion adjacent to the translucent substrate, thereby avoiding peel-off of the PSL layer from the substrate surface and ensuring good cohesiveness and strength of the PSL, also avoiding cohesive failure within the PSL. Also, the adhesion on the surface opposite the translucent substrate is still sufficient for fixing a printing form during a printing operation, yet is low enough to allow easy exchange of the printing form.

Printing Form Attachment Cylinder

The laminate structure of substrate layer (support) and PSL layer may be attached to a printing form attachment cylinder (flexographic printing cylinder), with the substrate (support) facing towards the cylinder or printing sleeve. The other surface of the laminate can then serve to fix the printing form (flexographic printing plate) during printing operation, so that the laminate of substrate layer (support) and PSL can serve as adhesive printing form attachment layer.

Due to the relatively low adhesion of the PSL at the radially outer surface, a sufficiently strong adhesive bond due to the tackiness or stickiness of the PSL is established. Due to the higher adhesion of the PSL at the side towards the translucent substrate and throughout the layer thickness, good strength and cohesion of the adhesive printing form attachment layer is secured. Thereby, a long lifetime can be achieved. Further, as new printing forms can be attached easier and residual material from previous printing processes can be removed by washing the adhesive printing form attachment layer with a suitable organic solvent such as ethyl acetate, the operating times of the printing machine can be increased.

The method of the present invention also allows adjusting the circumference of the printing cylinder to the desired degree by adjusting the thickness of the support and the PSL accordingly. As the PSL is very smooth, there are also no bumps that are transposed to the printing form, so that print quality is improved.

Optionally, the APFAL can be attached to the printing cylinder via a cushioning layer, in order to adjust the circumference of the cylinder. Such a cushioning layer can, e.g., be made from polyurethane, such as a flexible or foamed polyurethane layer. The adhesive printing form attachment layer can then be attached to such a layer via an adhesive. The cushioning layer can also be attached to the cylinder by means of an adhesive, or can in a preferred aspect possess adhesive properties in itself, so that no additional adhesive is needed.

In practice, often several printing form attachment cylinders are provided that are used to print different parts or colors of an image. Of course the benefits of the present invention are also pronounced if several of such printing cylinders are used. The present invention thus also relates to a set of two or more printing cylinders, each comprising the adhesive printing form attachment layer of the present invention attached to a plate cylinder, optionally via a cushioning layer.

Method of Operating a Printing Machine

The present invention further provides a method of operating a printing machine, the method comprising
Providing an APFAL according to the invention on a printing cylinder, the PSL facing radially outwards;
Attaching a printing form to the PSL of the APFAL;
Conducting printing using the printing form attached to the printing form attachment layer;
Replacing the used printing form by a new printing form and conducting printing with the new printing form, once or several times,
Cleaning the permanently sticky layer using a solvent, and
Attaching a printing form to the printing cylinder via the cleaned permanently sticky layer, and conducting printing.

The method of the present invention utilizes the permanently sticky properties of the PSL such that a printing form can be securely held during a printing operation. The use of double-sided adhesive tape is not necessary, and several printing forms can be attached, used for printing and then detached again. Cleaning using a solvent, such as organic solvent, e.g., based ethyl acetate or acetone, to remove dirt from the printing operation is then able to restore the permanently sticky properties of the PSL, making the APFAL ready for further use.

What is claimed is:

1. An adhesive printing form attachment layer comprising:
a support; and
a permanently sticky layer disposed on the support, the permanently sticky layer comprising a crosslinked polyurethane-based material,
wherein, the permanently sticky layer has a first surface facing the support, a second surface facing away from the support, and a thickness between the first surface and the second surface; and
wherein, an average value of adhesion of the permanently sticky layer throughout 20% of the thickness from the second surface is lower than an average value of adhesion of the permanently sticky layer throughout 20% of the thickness from the first surface.

2. The adhesive printing form attachment layer of claim 1, wherein
the support has a thickness of 50 μm to 800 μm;
the support comprises one or more of polyethylene terephthalate, polyvinyl chloride, polyethylene, polyamide, and polypropylene;
the support is able to transmit electromagnetic radiation having a wavelength of 250 nm to 750 nm through the thickness; and
the thickness of the permanently sticky layer is 0.05 mm to 1.00 mm.

3. The adhesive printing form attachment layer of claim 1, wherein
the permanently sticky layer exhibits an adhesion of 60 nN or greater at any region throughout the thickness.

4. The adhesive printing form attachment layer of claim 1, wherein
the crosslinked polyurethane-based material is 90% by weight or greater of the permanently sticky layer.

5. The adhesive printing form attachment layer of claim 1, wherein
the crosslinked polyurethane-based material of the permanently sticky layer is a product of crosslinking a crosslinkable composition comprising a polyurethane-based polymeric compound that has two or more crosslinkable groups.

6. The adhesive printing form attachment layer of claim 5, wherein, the two or more crosslinkable groups are ethylenically unsaturated groups.

7. The adhesive printing form attachment layer of claim 5, wherein
the polyurethane-based polymeric compound is represented by formula (I)

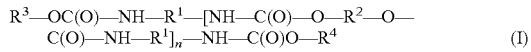

R³ represents an organic group comprising a crosslinkable group;
R⁴ represents an organic group comprising a crosslinkable group;
R³ and R⁴ may be the same or different from each other;
n is an integer of 1 to 1000;
R¹ are divalent linking groups that may be the same or different from each other; and
R² is a divalent linking group, and in case there are multiple R², the multiple R² may be the same or different from each other.

8. The adhesive printing form attachment layer of claim 7, wherein
R¹ is selected from a group consisting of toluene diisocyanate, methylene diphenyl diisocyanate, 1,4-Butanediisocyanate, 1,6-Hexamethylenediisocyanate, 2,2,4-Trimethylhexamethylene diisocyanate, Ethyl-2,6-diisocyanatohexanoate, Methyl-2,6-diisocyanatohexanoate, Isophorone diisocyanate, and 1,4-Cyclohexane diisocyanate; and
R² is hydrogenated polybutadiene.

9. The adhesive printing form attachment layer of claim 7, wherein
R³ and R⁴ comprise a structure represented by formula (III)

X is hydrogen or a methyl group, and L is a divalent connecting group binding the group of formula (III) to the remainder of the polyurethane-based polymeric compound.

10. The adhesive printing form attachment layer of claim 5, wherein
the polyurethane-based polymeric compound is represented by formula (II)

J is an m-valent organic group;
m is an integer of 2 to 100;
each of the multiple Y, which may be the same or different from each other, is a group represented by

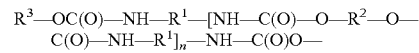

or

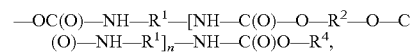

R³ represents an organic group comprising a crosslinkable group;
R⁴ represents an organic group comprising a crosslinkable group;
R³ and R⁴ may be the same or different from each other;
n is an integer of 1 to 1000;
R¹ is a divalent linking group, and in case there are multiple R¹, the multiple R¹ may be the same or different from each other; and
R² is a divalent linking group, and in case there are multiple R², the multiple R² may be the same or different from each other.

11. The adhesive printing form attachment layer of claim 10, wherein
the polyurethane-based polymeric compound is represented by the formula C(CH₂CH₃)(CH₂OZ)₃, where Z is R³—OC(O)—NH—R¹—[NH—C(O)—O—R²—O—C(O)—NH—R¹]ₙ—NH—C(O)—.

12. The adhesive printing form attachment layer of claim 5, wherein
the polyurethane-based polymeric compound has a repeating unit containing a polymeric group selected from the group consisting of:
(i) homopolymers and copolymers of two or more ethylenically unsaturated compounds selected from the group consisting of: styrenes, alkenes and polyenes having 2 to 12 carbon atoms, and cycloalkenes having 3 to 12 carbon atoms;
(ii) a polyether polyol; and
(iii) a polyester polyol; and
the polymeric group has a weight average molecular weight of 500 to 10,000.

13. The adhesive printing form attachment layer of claim 5,
wherein, the polyurethane-based polymeric compound has a polyurethane backbone obtained by either (i) reacting a tri- or higher functional isocyanate with a diol or (ii) reacting a tri- or higher functional polyol with a diisocyanate.

14. The adhesive printing form attachment layer of claim 5,
wherein, the crosslinkable composition further comprises a (meth)acrylic monomer selected from a group consisting of:
(i) (meth)acrylic monomers represented by formula (A-1)

wherein, X is H or CH₃, and
wherein, R⁵ is H or an organic group having 1-18 carbon atoms;

(ii) (meth)acrylic monomers represented by formula (A-2)

$$CH_2=CX'-C(O)OR^6OC(O)CX'=CH_2 \quad (A\text{-}2)$$

wherein, X' is independently H or $CH_3$, and
wherein, $R^6$ is a divalent group having 2 to 18 carbon atoms;

(iii) (meth)acrylic monomers represented by formula (A-3)

$$R^7-(OCR^8HCH_2)_{n'}-(OCH_2CR^8H)_{m'}-L'-OC(O)-CX=CH_2 \quad (A\text{-}3)$$

wherein, $R^7$ is H or a $C_{1-6}$ alkyl group,
wherein, X is H or $CH_3$,
wherein, $R^8$ is H or $CH_3$,
wherein, m' is an integer from 0 to 100,
wherein, n' is an integer from 0 to 100,
wherein, n'+m' is 2 to 100, and
wherein, L' is a single bond or a divalent linking group; and (iv) (meth)acrylic monomers represented by formula (A-4):

$$H_2C=CX-C(O)O-L''-(OCR^8HCH_2)_{n''}-(OCH_2CR^8H)_{m''}-L''-OC(O)-CX=CH_2 \quad (A\text{-}4)$$

wherein, X is H or $CH_3$,
wherein, $R^8$ is H or $CH_3$,
wherein, m'' is an integer from 0 to 100,
wherein, n'' is an integer from 0 to 100,
wherein, n''+m'' is 2 to 100, and
wherein, L'' is a single bond or a divalent linking group.

15. The adhesive printing form attachment layer of claim 5, wherein
the crosslinkable composition further comprises one or more (meth)acrylic monomers, and the one or more (meth)acrylic monomers are 0.5% by weight to 30% by weight of the crosslinkable composition, excluding any solvent;
the polyurethane-based polymeric compound is at least 50 wt % or more of the crosslinkable composition, excluding any solvent;
the support layer has a thickness of 50 μm to 800 μm, and comprises a material selected from a group consisting of polyethylene terephthalate, polyvinyl chloride, polyethylene, polyamide, and polypropylene; and
the crosslinkable composition has a thickness of 250 μm to 500 μm.

16. The adhesive printing form attachment layer of claim 5, wherein
the polyurethane-based polymeric compound is represented by the formula $C(CH_2CH_3)(CH_2OC(O)-NH-[C_6H_{12}NH-C(O)-(O)-C_4H_8-O-C(O)-NH]_{20}-C_6H_{12}NH-C(O)OCH_2CH_2OC(O)C(=CH_2)CH_3)_3$.

17. The adhesive printing form attachment layer of claim 5, wherein
the crosslinkable composition further comprises 3 wt % to 25 wt % of one or more of trimethylol propane trimethacrylate (TMPTMA) and trimethylol propane triacrylate (TMPTA).

18. An adhesive printing form attachment layer comprising:
a support; and
a permanently sticky layer disposed on the support, the permanent sticky layer comprising a crosslinked polyurethane-based material;
wherein, the permanently sticky layer has a first surface facing the support, a second surface facing away from the support, and a thickness between the first surface and the second surface; and
wherein, an average value of adhesion of the permanently sticky layer throughout 20% of the thickness from the second surface is lower than the average value of adhesion of the permanent sticky layer at a center of the permanently sticky layer.

19. An adhesive printing form attachment layer comprising:
a support; and
a permanently sticky layer disposed on the support, the permanently sticky layer comprising a crosslinked polyurethane-based polymer;
wherein, the crosslinked polyurethane-based material of the permanently sticky layer is a product of crosslinking a crosslinkable composition comprising a polyurethane-based polymeric compound that has two or more crosslinkable groups;
wherein, the polyurethane-based polymeric compound is represented by formula (I)

$$R^3-OC(O)-NH-R^1-[NH-C(O)-O-R^2-O-C(O)-NH-R^1]_n-NH-C(O)O-R^4 \quad (I)$$

$R^3$ represents an organic group comprising a crosslinkable group;
$R^4$ represents an organic group comprising a crosslinkable group;
$R^3$ and $R^4$ may be the same or different from each other;
n is an integer of 1 to 1000;
$R^1$ are divalent linking groups that may be the same or different from each other; and
$R^2$ is a divalent linking group, and in case there are multiple $R^2$, the multiple $R^2$ may be the same or different from each other;
wherein, $R^1$ and $R^2$ have a molecular weight of 200 to 10,000.

* * * * *

UNITED STATES PATENT AND TRADEMARK OFFICE
CERTIFICATE OF CORRECTION

PATENT NO. : 12,006,455 B2
APPLICATION NO. : 17/144412
DATED : June 11, 2024
INVENTOR(S) : Nils Thebud It is certified that error appears in the above-identified patent and that said Letters Patent is hereby corrected as shown below:

In the Specification

Column 5, Line 19:
"$(OCR^8HH_2)_{n''}$" should be -- $(OCR^8HCH_2)_{n''}$ --.

Column 12, Line 52:
"a-methyl" should be -- α-methyl --.

Signed and Sealed this
Twelfth Day of November, 2024

Katherine Kelly Vidal
*Director of the United States Patent and Trademark Office*